United States Patent [19]
Mahurin

[11] Patent Number: 6,006,244
[45] Date of Patent: Dec. 21, 1999

[54] CIRCUIT FOR SHIFTING OR ROTATING OPERANDS OF MULTIPLE SIZE

[75] Inventor: Eric W. Mahurin, Austin, Tex.

[73] Assignee: Advanced Micro Devices, Inc., Palo Alto, Calif.

[21] Appl. No.: 08/994,816

[22] Filed: Dec. 19, 1997

[51] Int. Cl.[6] .................................................... G06F 5/01
[52] U.S. Cl. ........................................................... 708/209
[58] Field of Search ............................................. 708/209

[56] References Cited

U.S. PATENT DOCUMENTS

| | | | |
|---|---|---|---|
| 4,472,788 | 9/1984 | Yamazaki | 708/209 |
| 4,490,809 | 12/1984 | Ueda et al. | 364/900 |
| 4,631,703 | 12/1986 | Sakamoto | 364/900 |
| 4,831,571 | 5/1989 | Tokumaru | 364/715.08 |
| 4,839,839 | 6/1989 | Tokumaru et al. | 364/715.08 |
| 5,553,010 | 9/1996 | Tanihira et al. | 708/209 |
| 5,671,166 | 9/1997 | Omote | 364/715.08 |
| 5,726,926 | 3/1998 | Makino | 708/209 |
| 5,822,231 | 10/1998 | Wong et al. | 708/209 |
| 5,844,828 | 12/1998 | Fujimura et al. | 708/209 |

*Primary Examiner*—David H. Malzahn
*Attorney, Agent, or Firm*—Conley, Rose & Tayon P.C.

[57] ABSTRACT

A circuit is disclosed for shifting and rotating operands of multiple size. In one embodiment, first and second shifter circuits are provided with the first shifter circuit configured to receive a z bit operand. In this embodiment, the first and second shifter circuits can operate in one of several modes depending on the size of the operand to be shifted or rotated. In one mode, the z bit operand provided to the first shifter circuit includes a y bit operand to be shifted and a copy thereof. The y bit operand and its copy are separated by a plurality of bits each one of which represents a logical zero. The first shifter circuit is coupled to first and second control nodes which are configured to receive control signals. When the first and second control nodes receive a first control signal, the first shifter circuit operates as a full shifter for shifting the received z bit operand in one direction by x bits. When the first and second control nodes receive a second control signal, the first shifter circuit operates as a partial shifter for shifting y bits of the received z bit operand in the one direction by x bits.

13 Claims, 2 Drawing Sheets

CIRCUIT FOR SHIFTING OR ROTATING OPERANDS OF MULTIPLE SIZE

BACKGROUND OF THE INVENTION

1. Field of the Invention

This invention relates to shifters or rotators, and more particularly to a circuit for shifting or rotating operands of multiple size.

2. Description of the Relevant Art

Microprocessors determine the speed and power of personal computers, and a growing number of more powerful machines, by handling most of the data processing in the machine. Microprocessors typically include at least three functional groups: the input output unit (I/O), the control unit and the arithmetic logic unit (ALU). The I/O unit interfaces between external circuitry and the ALU and the control unit. I/O units frequently include signal buffers for increasing the current capacity of the signal before the signal is sent to external components. The control unit controls the operation of the microprocessor by fetching instructions from the I/O unit and translating the instructions into a form that can be understood by the ALU. In addition, the control unit keeps track of which step of the control unit is being executed. The ALU handles the mathematical computations and logical operations that are performed by the microprocessor. The ALU executes the decoded instructions received from the control unit to modify data contained in registers within the processor.

Essential components of any ALU include the operand shifter and operand rotator. The shifter generally operates to shift an operand left or right by x bits with zero fill. The rotator generally operates to rotate an operand left or right by x bits. Often times, the shifter and rotator are combined into a single shifter/rotator circuit in order to conserve the physical size of the ALU. Furthermore, the shifter/rotator can be constructed and operated to shift or rotate operands of multiple size to avoid employing several shifter/rotators each designated for use on operands of a single size.

FIG. 1 illustrates a prior art shifter/rotator 10 capable of shifting or rotating eight bit or four bit operands either left or right depending upon the control signals inputted thereto and how the shifter/rotator 10 is loaded. Generally, shifter/rotator 10 is a double left shifter configured to also right shift operands provided thereto as will be more fully explained below. Shifter/rotator 10 includes a pre-shift stage 12 which has two functions one of which is to pre-shift four bit operands so that they are properly aligned for a rotation operation. Shifter/rotator 10 also includes a first shifting stage 14 for shifting operands provided thereto by one bit, second shifting stage 16 for shifting operands provided thereto by two bits, and third shifting stage 18 for shifting operands provided thereto by four bits. Shifter/rotator 10 is arranged so that the first, second, and third shifting stages 14, 16, and 18, respectively, receive the result operand of the pre-shifting, first, and second shifting stages, respectively.

Shifter/rotator 10 further includes upper input nodes 20, lower input nodes 22, and output nodes 26. The eight output nodes 26 provide the results of shifting or rotating an eight bit operand, while the four least significant output nodes 26 provide the results of shifting or rotating a four bit operand.

As noted above, shifter/rotator 10 operates to shift or rotate four or eight bit operands depending upon the operands provided to input nodes 22 and 24. More specifically, a shift left of an eight bit operand is accomplished by providing the eight bit operand to be shifted to the upper input nodes 20 and logical zeros to each of the lower input nodes 22. A shift right of an eight bit operand is accomplished by providing a logical zero to each of the upper input nodes 20 and the eight bit operand to be shifted to the lower input nodes 22. Rotating an eight bit operand left or right is accomplished by providing the eight bit operand to both the upper and lower input nodes 20 and 22, respectively.

A shift left of a four bit operand is accomplished by providing the four bit operand to be shifted to the four least significant upper input nodes 20, a logical zero to each of the four most significant upper input nodes 20, and a logical zero to each of the lower input nodes 22. Shifting a four bit operand right is accomplished by providing a logical zero to each of the upper input nodes 20, a logical zero to each of the four most significant lower input nodes 22, and the four bit operand to be shifted to the four least significant lower input nodes 22. Rotating a four bit operand either left or right is accomplished by providing the four bit operand to be rotated to the four least significant upper and lower input nodes 20 and 22, respectively, and a logical zero to each of the four most significant upper and lower input nodes 20 and 22, respectively.

Pre-shift stage 12 is configured to receive a sixteen bit operand consisting of the concatenated bits provided to upper and lower input nodes 20 and 22. Pre-shift stage 12 includes a pair of shifting stages which operate to selectively shift the sixteen bit operand left by one and/or realign a four bit operand provided to the four least significant lower input nodes 22. One of the pair of shifting stages includes a first set of multiplexers 44 coupled to and controlled by a pre-shift control node 46. The other shifting stage includes a second set of multiplexers 50 coupled to and controlled by a right shift control node 52. Multiplexers 44 operate to selectively left shift the four bit operand provided to the four least significant lower input nodes 22 in accordance with a control signal provided to pre-shift control node 46. More specifically multiplexers 44 operate to pass either the four bit operand provided to the four least significant lower input nodes 22 when pre-shift control node 46 receives a logical one, or the four logical zeros provided to the four most significant lower input nodes 22 when pre-shift control node 46 receives a logical zero. In general, multiplexers 44 shift or align the four bit operand provided to shifter/rotator when shifter/rotator circuit 10 is employed to rotate a four operand left or right. Multiplexers 50 operate to selectively shift the sixteen bit operand, with or without realignment by multiplexers 44, left by one according to a control signal provided to right shift control node 52. More specifically, multiplexers 50 operate to pass either the fifteen least significant bits of the sixteen bit operand provided thereto when the right shift control node 52 receives a logical one, or the fifteen most significant bits of the sixteen bit operand provided thereto when the right shift control node 52 receives a logical zero. As will be described below, multiplexers 50 of pre-shift stage 12 operate to shift left by one when shifter/rotator 10 is employed to right shift or right rotate a four or eight bit operand.

First shifting stage 14 includes a plurality of two input multiplexers 30 coupled to and controlled by a first shift control node 32. First shifting stage 14 is configured to receive the fifteen bit result operand of pre-shift stage 12. First shift stage 14 operates to selectively shift the result operand left by one bit according to a control signal provided to the first shift control node 32. In other words, first shifting stage 14 operates to pass either the fourteen least significant bits of the fifteen bit result operand provided by pre-shift stage 12 when the first shift control node 32 receives a logical one, or the fourteen most significant bits of the fifteen bit result operand provided by pre-shift stage 12 when the first shift control node 32 receives a zero.

Second shifting stage 16 includes a plurality of two input multiplexers 34 coupled to and controlled by second shift control node 36. Second shifting stage 16 is configured to receive the fourteen bit result operand of the first shifting stage 14. Second shifting stage 16 operates to selectively shift the result operand left by two bits in accordance with a control signal provided to second shift control node 36. In other words, second shifting stage 14 operates to pass either the twelve least significant bits of the fourteen bit result operand provided by first shifting stage 14 when the second shift control node 36 receives a logical one, or the twelve most significant bits of the fourteen bit result operand provided by first shifting stage 14 when the second shift control node 36 receives a logical zero.

Third shifting stage 18 comprises a plurality of two input multiplexers 40 coupled to and controlled by a third shift control node 42. Third shift control node 42 is configured to receive the twelve bit result operand provided by second shifting stage 16. Third shifting stage 18 operates to selectively shift the result operand left by four bits in accordance with a control signal provided to third shift control node 42. In other words, third shifting stage 16 operates to pass either the eight least significant bits of the twelve bit result operand provided by second shifting stage 16 when the third shift control node 42 receives a logical one, or the eight most significant bits of the twelve bit result operand provided by second shifting stage 16 when the third shift control node 42 receives a logical zero.

As noted above, shifter/rotator is a double left shifter which can right shift operands in addition to left shifting operands. Shifter/rotator can also rotate operands left or right. One of ordinary skill in the art will recognize that shifting or rotating an operand right by a designated shift count using a double left shifter is equivalent to shifting or rotating the same operand by the negative of the shift count. Further, one of ordinary skill in the art will recognize that in two's compliment notation, the negative of the shift count equates to the complemented shift count and binary one. Rather than employing a separate circuit to calculate the negative shift count in order to achieve a right shift or a right rotate, the shifter/rotator circuit 10 achieves right shift or a right rotate simply by complementing the shift input provided to control nodes 32, 36 and 42, and by asserting logical one to the right shift control node 52.

As noted above, each shifting stage 12–18 is controlled by corresponding control nodes 32, 36, 42, 46, and 52. Control nodes 32, 36, and 42 receive a shift count provided by an instruction to shift or rotate an operand. Control nodes 52 and 46 receive control signals associated with instructions for right shifting four or eight bit operands and/or rotating four bit operands. For example, when an eight bit operand is to be shifted or rotated left by five bits, control nodes 32, and 42 receive a logical one while control nodes 36, 52 and 46 receive a logical zero. When a four bit operand is to be shifted left by three bits, control nodes 32 and 36 receive a logical one while control node 42, 52 and 46 receive a logical zero. When a four bit operand is to be rotated left by three bits, control nodes 32, 46 and 36 receive a logical one while control node 42 and 52 receive a logical zero.

As can be appreciated, pre-shift stage 12 complicates the design and operation of shifter/rotator 10. More particularly, pre-shift stage 12 is complicated by the presence of the first set of multiplexers 44 coupled to and controlled by the pre-shift control node 46. Shifter/rotator 10 would require an even more complicated pre-shifting stage 12 if shifter/rotator 10 were configured to shift four, eight or sixteen bit operands.

From an inspection of FIG. 1 and the description relating thereto above, it is apparent that operation and implementation of shifter/rotator 10 can be simplified if the first set of multiplexers 44 within pre-shift stage 12 can be eliminated. This would have the effect of reducing the size of the shifter/rotator 10 in addition to increasing its speed of operation.

SUMMARY OF THE INVENTION

The problems identified above are in large part solved by a circuit for shifting or rotating operands of multiple size. In one embodiment, first and second shifter circuits are provided, the first shifter circuit configured to receive a z bit operand. In this embodiment, the first and second shifter circuits can operate in one of several modes depending on the size of the operand to be shifted or rotated. In one mode, the z bit operand provided to the first shifter circuit includes a y bit operand to be rotated and a copy thereof. The y bit operand and its copy are separated by a plurality of bits each one of which represents a logical zero.

The first shifter circuit is coupled to first and second control nodes which are configured to receive control signals. When the first and second control nodes receive a first shift control signal, the first shifter circuit operates as a full shifter for shifting the received z bit operand in one direction by x bits. When the first and second control nodes receive a second control signal, the first shifter circuit operates as a partial shifter for shifting y bits of the received z bit operand in the one direction by x bits. The second shifter circuit is coupled to the first shifter circuit and operates to selectively shift the result operand provided by the first shifter circuit.

In one embodiment the first shifter circuit includes first and second sets of multiplexers, and an OR gate. Each multiplexer of the first and second set has a pair of data inputs, a control input and a data output. The OR gate has a pair of inputs and an output. The inputs of the OR gate are coupled to the first and second control nodes. The output of the OR gate is coupled to the control inputs of the first set of multiplexers. The control inputs of the second set of multiplexers are coupled to the second control node.

The first shifter circuit operates as a full shifter when a logical one is provided to the second control node. The first shifter circuit operates as a partial shifter when a logical zero is provided to the second control node and a logical one is provided to the first control node.

The first shifter circuit operating as a partial shifter provides a result operand in which the y bit operand and its copy are concatenated. In selectively shifting the result operand provided by the first shifter circuit, the second shifter can generate a result operand which represents the rotation of the y bit operand.

One advantage of the present invention is that it eliminates the multiple stage pre-shifter of the prior art.

Another advantage of the present advantage is that it reduces signal propagation delay associated with prior art pre-shifting stages.

Yet another advantage of the present is that it operates to rotate operands at a higher frequency when compared to the prior art.

BRIEF DESCRIPTION OF THE DRAWINGS

Other objects and advantages of the invention will become apparent upon reading the following detailed description and upon reference to the accompanying drawings in which.

Figure 1:
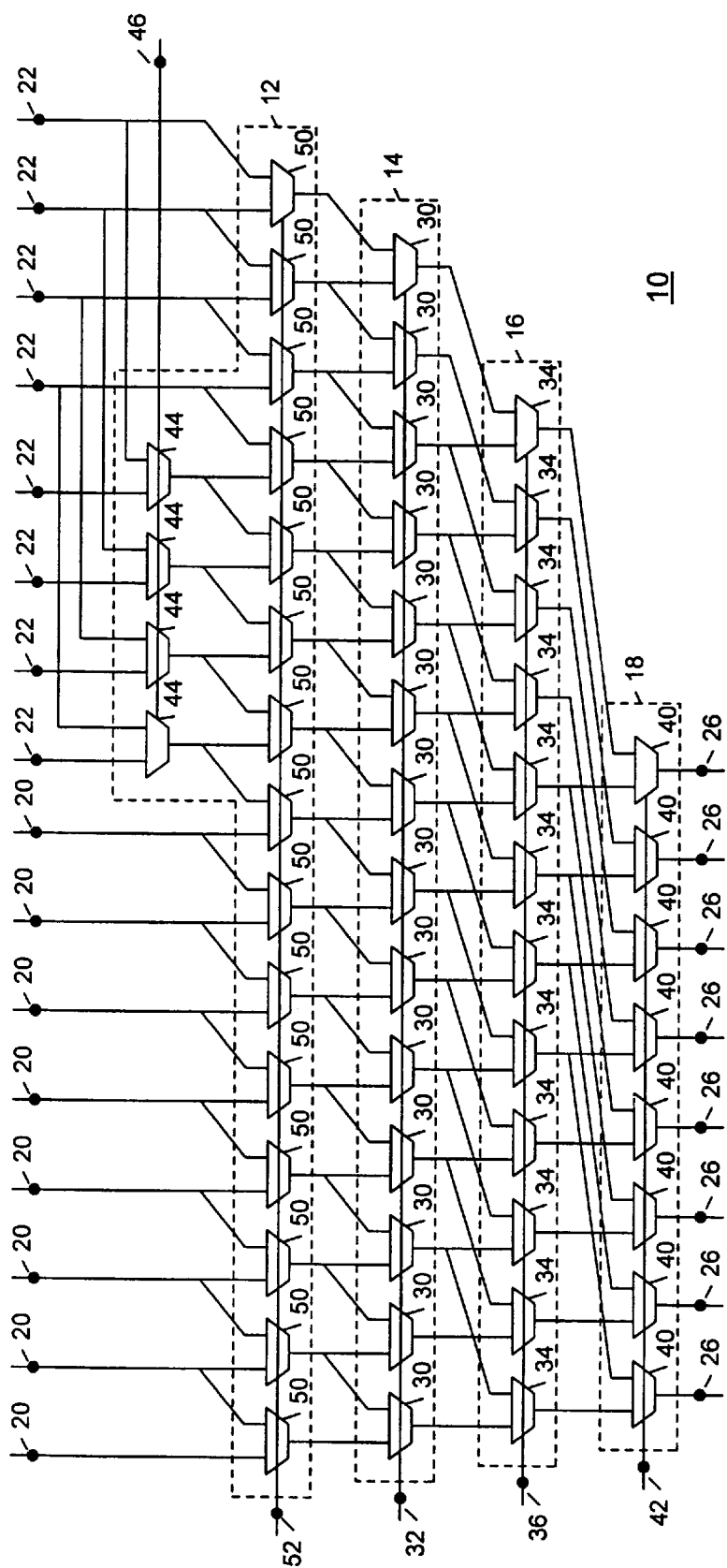
FIG. 1 is a schematic of a prior art shifter/rotator.

While the invention is susceptible to various modifications and alternative forms, specific embodiments thereof are shown by way of example in the drawings and will herein be described in detail. It should be understood. However, that the drawings and detailed description thereto are not intended to limit the invention to the particular form disclosed, but on the contrary, the intention is to cover all modifications, equivalents and alternatives following within the spirit and scope of the present invention as defined by the appended claims.

Detailed Description of the Preferred Embodiments

Figure 2:
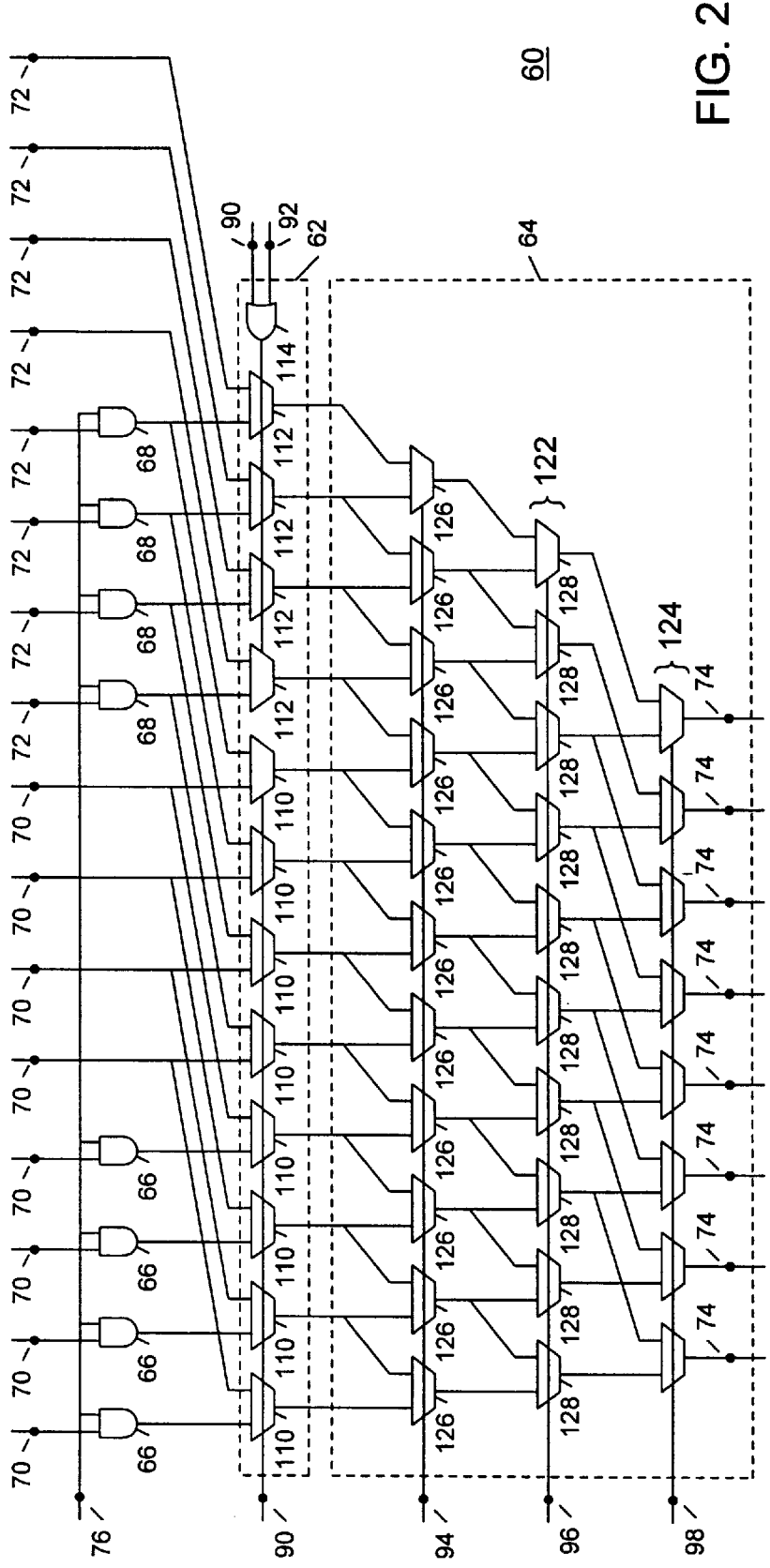
FIG. 2 is a schematic diagram of a shifter/rotator implying the present invention.

FIG. 2 is a schematic diagram of one embodiment of a shifter/rotator 60 imploying the present invention. Description of the present invention will be made with respect to a shifter/rotator configured to shift or rotate four or eight bit operands either left or right. However, the present invention should not be limited thereto. More particularly, the present invention has broader applications including use within a rotator or rotator/shifter which can shift operands with sizes other than four and/or eight bits.

Shifter/rotator 60 includes a first shifter circuit 62, and a second shifter circuit 64. Shifter/rotator 60 further includes first and second sets of AND gates 66 and 68, upper input nodes 70, lower inputs nodes 72, and output nodes 74. Upper and lower input nodes 70 and 72 are configured to receive four or eight bit operands to be shifted or rotated. AND gates 66 are coupled between the four most significant upper input nodes 70 and first shifter circuit 62. AND gates 68 are coupled between the four most significant lower input nodes 72 and first shifter circuit 62. AND gates 66 and 68 are coupled to an eight bit control node 76 and operate to zero out the four most significant bits provided to the upper and lower input nodes 70 and 72 in response to a logical zero provided to eight bit control node 76. A zero is provided to control node 76 when shifter/rotator 60 operates to shift or rotate four bit operands. Alternatively, first and second AND gates 66 and 68 operate past the four most significant bits provided to upper and lower input nodes 70 and 72 when a logical one is provided to control node 76. A logical one is provided to control node 76 when the shifter/rotator 60 operates to shift or rotate eight bit operands. It is noted that first and second sets of AND gates 66 and 68 are redundant if a logical zero is provided to each of the four most significant upper and/or lower input notes 70 and 72 when rotating or shifting a four bit operand.

Shifter/rotator circuit 60 operates to shift or rotate four or eight bit operands either left or right depending upon control signals inputted thereto (more particularly described below) and on how the upper and lower input notes 70 and 72 are loaded. With respect to loading the upper and lower input nodes 70 and 72, shifter/rotator 60 can operate to rotate an eight bit operand either left or right when the eight bit operand and a copy thereof are provided to the upper and lower input nodes 70 and 72, respectively. Shifter/rotator 60 can operate to shift an eight bit operand left when the eight bit operand is loaded into the upper input nodes 70 and each lower input node 72 is provided with a logical zero. Conversely, shifter/rotator 60 can shift an eight bit operand right by loading the eight bit operand into the lower input node 72 and providing a logical zero to each of the upper input nodes 70.

A four bit operand can be rotated left or right by shifter/rotator 60 if the four bit operand and a copy thereof are provided to the four least significant upper and lower input nodes 70 and 72, respectively. If AND gates 66 and 68 were not present, rotating a four bit operand would also require that the four most significant upper and lower input nodes 70 and 72 be loaded with a logical zero. Shifter/rotator 60 can operate to shift a four bit operand left by inputting the four bit operand to the four least significant upper input nodes 70. If AND gates 66 and 68 were not present, shifter/rotator 60 would also require logical zeros to be provided to at least the four most significant lower input nodes 72 in order to shift a four bit operand left. Shifter/rotator 60 can operate to shift a four bit operand right by loading the four bit operand into the four least significant lower input nodes 72. Again, if AND gates 66 and 68 were not present, the four most significant lower input nodes 70 and 72 would also require logical zeros to shift a four bit operand right.

First shift circuit 62 is configured to receive a sixteen bit operand representing the concatenation of the operands provided to the upper and lower input nodes 70 and 72. First shifting circuit 62 is coupled to first and second control nodes 90 and 92. When first and second control nodes 90 and 92 receive a first control signal, first shifting circuit 62 operates to shift the sixteen bit operand left by four bits to produce a twelve bit result operand. In other words, when control nodes 90 and 92 receive the first shift control signal, first shifting circuit 62 operates to pass the twelve least significant bits of the sixteen bit operand inputted thereto. When control nodes 90 and 92 receive a pass signal, first shifting circuit 62 operates to pass the sixteen bit operand. In other words, when first and second control nodes 90 and 92 receive the pass signal, first shifting circuit 62 operates to pass the twelve most significant bits of the sixteen bit operand. In response to receiving a second (or partial) shift control signal at first and second control nodes 90 and 92, first shifting circuit 62 operates as a partial shifter for shifting the four least significant bits of the sixteen bit operand while passing the eight most significant bits of the sixteen bit operand. In other words, when first and second control nodes 90 and 92 receive the second shift control signal, first shifter circuit 62 operates to pass the eight most significant bits and the four least significant bits of the sixteen bit operand to produce the twelve bit result operand. This partial shift operation can be used in four bit rotate operations to align the four bit operand provided to the four least significant lower input nodes 72 with the copy thereof provided to the four least significant upper input nodes 70, so that the four bit operand and its copy occupy the eight least significant bits of the twelve bit result operand provided by first shift circuit 62. It should be noted that first shifting circuit 62 should not be limited to generating twelve bit result operands. Rather, shifting circuit 62 could generate sixteen bit result operand, for example, which represents the sixteen bit input shifted left by four bits with zero fill.

In one embodiment, second shift circuit 64 is coupled to and controlled by a right shift control node 94, a first shift control node 96 and a second shift control node 98. The second shift circuit 64 is configured to receive the twelve bit result operand provided by first shifter circuit 62. In response to receiving control signals at nodes 94–98 and the twelve bit result operand provided by first circuit 62, second shift circuit 64 outputs an eight bit operand at output nodes 74. When shifter/rotator 60 operates to shift or rotate an eight bit operand, the result is provided to the eight output nodes 74. When shifter/rotator 60 operates to shift or rotate a four bit operand, the result is provided to the four least significant output nodes 74. Second shifting circuit 64, in general, operates to selectively shift the twelve bit result operand provided by first shifting circuit 62.

First shifting stage 62 includes a first set of multiplexers 110, a second set of multiplexers 112, and an OR gate 114. Each of the multiplexers 110 and 112 include a pair of inputs and an output. The inputs to the multiplexers are coupled to receive selective bits of the sixteen bit operand as shown in FIG. 2. Multiplexers 110 and 112 further include a control input. A control input of the first set of multiplexers 110 is couple to and controlled by the first control node 90. OR gate 114 has a pair of inputs coupled to the first and second control nodes 90 and 92. The output of OR gate 114 is couple to the control input at each of the second multiplexers 112. Accordingly, multiplexers 112 are controlled by the output of OR gate 114.

First shifting circuit 62 operates as a full shifter described above when a logical zero is provided to second control node 92 while either a logical zero or a logical one is provided to first control node 90. More particularly, the first shift control signal is defined as first input node 90 receiving a logical one. The pass control signal is defined as the first and second control nodes 90 and 92 receiving a logical zero. The second shift control signal (partial shift control signal) is defined as the first control node 90 receiving a logical zero and a second control node 92 receiving a logical one.

Second shifting circuit 64 includes a right shifting stage 120, a first shifting stage 122, and a second shifting stage 124. The right shifting stage is configured to receive the 12 bit result operand provided by first shifting stage 62. Right shifting stage 120 includes a plurality of two input multiplexers 126 coupled to and controlled by right shift control node 94. Right shifting stage operates to selectively shift left by on the twelve bit result operand provided thereto. More particularly, when a logical one is proved to right shift control node 94, right shifting stage 120 operates to pass the eleven least significant bits of the twelve bit result operand provided thereto. In contrast, when the logical zero is received at right shift control node 94, right shifting stage 120 operates to pass the eleven most significant bits of the twelve bit result bit operand received thereto.

Second shifting stage 122 includes a plurality of multiplexers 128 coupled to and controlled by first shifting control node 96. First shifting stage 122 is configured to receive the eleven bit result operand provided by right shifting stage 120. First shifting stage 122 operates to selectively shift left by one the eleven bit result operand inputted thereto. More particularly, when a logical one is provided to first shift control node 96, first shifting stage 122 operates to pass the ten least significant bits of the eleven bit result operand inputted thereto. In contrast, when a logical zero is provided to first shift control node 96, first shifting stage 122 operates to pass the ten most significant bits of the eleven bit result operand inputted thereto.

Second shifting stage 124 includes a plurality of multiplexers 130 couple to and controlled by second control node 98. Second shifting stage 124 operates to selectively shift left by two the ten bit result operand provided by first shifting stage 122. More particularly, when a logical one is provided to second control node 98, second shifting stage 124 operates to pass the eight least significant bits of the ten bit result operand provided by first shifting stage 122. In contrast, when a logical zero is provided to second shift control node 98, second shifting stage 124 operates to pass the eight most significant bits of the ten bit result operand provided thereto.

As noted above, shifter/rotator 60 can shift or rotate four or eight bit operands either left or right according to signals provided to control nodes 76, and 90–98. It was also noted that operation of shifter/rotator 60 depends upon how the upper and lower input nodes 70 and 72 are loaded.

Shifter/rotator 60 operates to left shift an eight bit operand by first loading the eight bit operand into the upper input nodes 70 and inputting a logical zero into each of the lower input nodes 72. Thereafter, appropriate control signals including a shift count are provided to the various control nodes. Table 1 below shows various settings for the control nodes for left shifting the eight bit operand.

TABLE 1

| Shift Count | 7 | 6 | 5 | 4 | 3 | 2 | 1 | 0 |
|---|---|---|---|---|---|---|---|---|
| Node |   |   |   |   |   |   |   |   |
| 8 bit (76) | 1 | 1 | 1 | 1 | 1 | 1 | 1 | 1 |
| $1^{st}$ control (90) | 1 | 1 | 1 | 1 | 0 | 0 | 0 | 0 |
| $2^{nd}$ control (92) | 0 | 0 | 0 | 0 | 0 | 0 | 0 | 0 |
| rt. Shift (94) | 0 | 0 | 0 | 0 | 0 | 0 | 0 | 0 |
| $1^{st}$ shift (96) | 1 | 0 | 1 | 0 | 1 | 0 | 1 | 0 |
| $2^{nd}$ shift (98) | 1 | 1 | 0 | 0 | 1 | 1 | 0 | 0 |

Upon completion, shifter/rotator 60 provides a left shifted eight bit operand at output nodes 74.

Shifter/rotator 60 can right shift an eight bit operand by first loading the eight bit operand into the lower input nodes 72 and by inputting a logical zero into each of the upper input nodes 70. Thereafter, the appropriate signals including the shift count are provided to the control nodes. Table 2 below shows the various signals to be provided to the control nodes needed to right shift the eight bit operand according to a particular shift count.

TABLE 2

| Shift Count | 7 | 6 | 5 | 4 | 3 | 2 | 1 | 0 |
|---|---|---|---|---|---|---|---|---|
| Node |   |   |   |   |   |   |   |   |
| 8 bit (76) | 1 | 1 | 1 | 1 | 1 | 1 | 1 | 1 |
| $1^{st}$ control (90) | 0 | 0 | 0 | 0 | 1 | 1 | 1 | 1 |
| $2^{nd}$ control (92) | 0 | 0 | 0 | 0 | 0 | 0 | 0 | 0 |
| rt. shift (94) | 1 | 1 | 1 | 1 | 1 | 1 | 1 | 1 |
| $1^{st}$ shift (96) | 0 | 1 | 0 | 1 | 0 | 1 | 0 | 1 |
| $2^{nd}$ shift (98) | 0 | 0 | 1 | 1 | 0 | 0 | 1 | 1 |

Upon completion, shifter/rotator 60 outputs the right shifted eight bit operand at output nodes 74.

Shifter/rotator 60 can rotate an eight bit operand left or right by first inputting the eight bit operand into both the upper and lower input nodes 70 and 72 and by inputting the appropriate control signals into the control nodes. Tables 3 and 4 below show the control signals required to be inputted to the control nodes in order to rotate the eight bit operand by a particular shift count.

TABLE 3

| Shift Count | 7 | 6 | 5 | 4 | 3 | 2 | 1 | 0 |
|---|---|---|---|---|---|---|---|---|
| Node |  |  |  |  |  |  |  |  |
| 8 bit (76) | 1 | 1 | 1 | 1 | 1 | 1 | 1 | 1 |
| 1$^{st}$ control (90) | 1 | 1 | 1 | 1 | 0 | 0 | 0 | 0 |
| 2$^{nd}$ control (92) | 0 | 0 | 0 | 0 | 0 | 0 | 0 | 0 |
| rt. shift (94) | 0 | 0 | 0 | 0 | 0 | 0 | 0 | 0 |
| 1$^{st}$ shift (96) | 1 | 0 | 1 | 0 | 1 | 0 | 1 | 0 |
| 2$^{nd}$ shift (98) | 1 | 1 | 0 | 0 | 1 | 1 | 0 | 0 |

TABLE 4

| Shift Count | 7 | 6 | 5 | 4 | 3 | 2 | 1 | 0 |
|---|---|---|---|---|---|---|---|---|
| Node |  |  |  |  |  |  |  |  |
| 8 bit (76) | 1 | 1 | 1 | 1 | 1 | 1 | 1 | 1 |
| 1$^{st}$ control (90) | 0 | 0 | 0 | 0 | 1 | 1 | 1 | 1 |
| 2$^{nd}$ control (92) | 1 | 1 | 1 | 1 | 0 | 0 | 0 | 0 |
| rt. shift (94) | 1 | 1 | 1 | 1 | 1 | 1 | 1 | 1 |
| 1$^{st}$ shift (96) | 0 | 1 | 0 | 1 | 0 | 1 | 0 | 1 |
| 2$^{nd}$ shift (98) | 0 | 0 | 1 | 1 | 0 | 0 | 1 | 1 |

Upon completion, shifter/rotator 60 output the eight bit operand rotated left or right at the output nodes 74.

Shifter/rotator 60 can shift a four bit operand left by a shift count by first inputting the four bit operand into the four least significant upper input nodes 70 and by inputting a logical zero into each of the lower input nodes 72. Thereafter, appropriate signals are provided to the control nodes. Table 5 below shows the appropriate control signals needed to achieve the various shift counts.

TABLE 5

| Shift Count | 3 | 2 | 1 | 0 |
|---|---|---|---|---|
| Node |  |  |  |  |
| 8 bit (76) | 0 | 0 | 0 | 0 |
| 1$^{st}$ control (90) | 0 | 0 | 0 | 0 |
| 2$^{nd}$ control (92) | 0 | 0 | 0 | 0 |
| rt. shift (94) | 0 | 0 | 0 | 0 |
| 1$^{st}$ shift (96) | 1 | 0 | 1 | 0 |
| 2$^{nd}$ shift (98) | 1 | 1 | 0 | 0 |

Upon shifting the four bit operand left, shifter/rotator 60 provides the result at the 4 least significant output bits 74.

Shifter/rotator 60 can shift a four bit operand right by first inputting the four bit operand into the four least significant lower input nodes 72 and by inputting a logical zero to each of the four least significant upper input nodes 70. Thereafter, appropriate control signals are provided to the various control nodes. Table 6 below shows the various settings for the control nodes needed to shift the four bit operand right by the corresponding shift count.

TABLE 6

| Shift Count | 3 | 2 | 1 | 0 |
|---|---|---|---|---|
| Node |  |  |  |  |
| 8 bit (76) | 0 | 0 | 0 | 0 |
| 1$^{st}$ control (90) | 1 | 1 | 1 | 1 |
| 2$^{nd}$ control (92) | 0 | 0 | 0 | 0 |
| rt. shift (94) | 1 | 1 | 1 | 1 |
| 1$^{st}$ shift (96) | 0 | 1 | 0 | 1 |
| 2$^{nd}$ shift (98) | 0 | 0 | 1 | 1 |

Upon shifting the four bit operand right, shifter/rotator 60 outputs the results on the four least significant output nodes 74.

Shifter/rotator 60 can rotate a four bit operand either left or right by first loading the four bit operand into the four least significant upper input nodes 70 and the four least significant lower input nodes 72. Thereafter, the four bit operand is rotated left or right by a shift count when the appropriate address signals are provided to the control nodes. Tables 7 and 8 shown below indicate the control signals to be inputted to the various control nodes to achieve left and right rotation of the four bit operand according to the various shift counts.

TABLE 7

| Shift Count | 3 | 2 | 1 | 0 |
|---|---|---|---|---|
| Node |  |  |  |  |
| 8 bit (76) | 0 | 0 | 0 | 0 |
| 1$^{st}$ control (90) | 0 | 0 | 0 | 0 |
| 2$^{nd}$ control (92) | 1 | 1 | 1 | 1 |
| rt. shift (94) | 0 | 0 | 0 | 0 |
| 1$^{st}$ shift (96) | 1 | 0 | 1 | 0 |
| 2$^{nd}$ shift (98) | 1 | 1 | 0 | 0 |

TABLE 8

| Shift Count | 3 | 2 | 1 | 0 |
|---|---|---|---|---|
| Node |  |  |  |  |
| 8 bit (76) | 0 | 0 | 0 | 0 |
| 1$^{st}$ control (90) | 0 | 0 | 0 | 0 |
| 2$^{nd}$ control (92) | 1 | 1 | 1 | 1 |
| rt. shift (94) | 1 | 1 | 1 | I |
| 1$^{st}$ shift (96) | 0 | 1 | 0 | 1 |

TABLE 8-continued

| Shift Count | 3 | 2 | 1 | 0 |
|---|---|---|---|---|
| 2$^{nd}$ shift (98) | 0 | 0 | 1 | 1 |

Upon completion of the four bit rotation either left or right, shifter/rotator 60 provides the results at four least significant output nodes 74.

In the prior art of FIG. 1, third stage 18 is necessary for shifting or rotating eight bit operands or for shifting four bit operands. However, the present invention recognizes that third stage 18 is redundant when rotating a four bit operand since rotation of a four bit operand by four bits results in the initial operand. Shifter/rotator 60 operates in accordance with this recognition. First shifting circuit 62 operates as a full four bit shifter when shifter/rotator 60, for example, operates to shift or rotate eight bit operands. Additionally, first shifting circuit 62 operates to align the four bit operand to be rotated in much the same fashion as multiplexers 44 of FIG. 1 when shifter/rotator 60 operates to rotate four bit operands. Shifter/rotator 60 lacks a dedicated four bit shifter. Thus, shifter/rotator 60 can perform the same rotates and shifts of four or eight bit operands as the prior art shown in FIG. 1 without the complicated double staged pre-shifter 12 or the third shifting stage 16.

While the present invention has been described with reference to particular embodiments, it will be understood that the embodiments are illustrative and that the invention scope is not so limited. Any variations, modifications, additions and improvements to the embodiment described. These variations, modifications, additions and improvements may fall within the scope of the invention as detailed within the following claims.

What is claimed is:

1. A shifting/rotating circuit comprising:
   first and second control nodes configured to receive control signals;
   a first shifter circuit coupled to the first and second control nodes, wherein the first shifter is configured receive a z bit operand, wherein, when the first and second control nodes receive a first shift control signal, the first shifter circuit operates as a full shifter for shifting the z bit operand in one direction by x bits, and wherein, when the first and second control nodes receive a second control signal, the first shifter circuit operates as a partial shifter for shifting y bits of the received z bit operand in the one direction by x bits, wherein x is less than y and y is less than z, and;
   a second shifter circuit coupled to the first shifter circuit for selectively shifting the result operand provided by the first shifter circuit.

2. The shifting/rotating circuit of claim 1:
   wherein the first shifter circuit comprises first and second sets of multiplexers, and an OR gate, wherein each multiplexer of the first and second set has a pair of data inputs, a control input and a data output, wherein the OR gate has a pair of inputs and an output, and;
   wherein the inputs to the OR gate are coupled to the first and second control nodes;
   wherein the output of the OR gate is coupled to the control inputs of the first set of multiplexers, and;
   wherein the control inputs of the second set of multiplexers are coupled to the second control node.

3. The rotating/shifting circuit of claim 2 wherein the first set of multiplexers are configured to receive the least significant 2x bits of the z bit operand.

4. The rotating/shifting circuit of claim 3 wherein the second set of multiplexers are configured to receive the most significant 3x bits of the z bit opernad.

5. The rotating/shifting circuit of claim 2 wherein one input of each multiplexer of the first set is configured to receive the least significant x bits of the z bit operand, and the other input of the first set of multiplexers is configured to receive the next least significant x bits of the z bit operand.

6. The rotating/shifting circuit of claim 5 wherein one input of each multiplexer of the second set is configured to receive the most significant 2x bits of the z bit operand, and the other input of the second set of multiplexers is configured to receive the next most significant 2x bits of the z bit operand.

7. A circuit for shifting or rotating operands comprising:
   a first circuit configured to receive a z bit operand, wherein the first circuit is configured to pass the y most significant bits of the received z operand when the first circuit operates in a first mode, wherein the first circuit is configured to pass the y least significant bits of the received z operand when the first circuit operates in a second mode, wherein the first circuit is configured to pass the least significant x bits and the (y-x) most significant bits of the received z bit operand when the first shifter circuit operates in a third mode, wherein x is less than y, and wherein y is less than z, and;
   a second circuit coupled to the first circuit and configured to receive a y bit operand, wherein the second circuit is configured to pass the w most significant bits of the received y bit operand when the second circuit operates in one mode, and wherein the second circuit is configured to pass the w least significant w bits of the received y bit operand when the second circuit operates in another mode.

8. The circuit of claim 7 wherein the first circuit comprises:
   first and second control nodes configured to receive first, second and third control signals, wherein the first circuit operates in the first mode when the first and second control nodes receive the first control signal, wherein the first circuit operates in the second mode when the first and second control nodes receive the second control signal, and wherein the first circuit operates in the third mode when the first and second control nodes receive the third control signal;
   a first set of multiplexers;
   a second set of multiplexers;
   an OR gate;
   wherein each multiplexer of the first and second set has a pair of data inputs, a control input and a data output, wherein the OR gate has a pair of inputs and an output, and wherein the first and second control nodes;
   wherein the inputs to the OR gate are coupled to the first and second control nodes;
   wherein the output of the OR gate is coupled to the control inputs of the first set of multiplexers, and;
   wherein the control inputs of the second set of multiplexers are coupled to the second control node.

9. The circuit of claim 8 wherein the first set of multiplexers are configured to receive the least significant 2x bits of the z bit operand.

10. The rotating/shifting circuit of claim 9 wherein the second set of multiplexers are configured to receive the most significant (y-x) bits of the z bit opernad.

11. The circuit of claim 7 wherein the z bit operand is defined as a pair of y bit operands concatenated together, wherein the least significant x bits of each y bit operand represents an operand to be rotated.

12. A circuit for rotating or shifting multiple sized operands, the circuit comprising:

a first circuit configured to receive a first operand and configured to generate a second operand, wherein the y most significant bits of the second operand equal the y most significant bits of the first operand, respectively, when the first circuit operates in a first mode, wherein the y most significant bits of the second operand equal the y least significant bits of the first operand, respectively, when the first circuit operates in a second mode, and wherein the (y−x) most significant bits of the second operand equal the (y−x) most significant bits of the first operand, respectively, and the x next most significant bits of the second operand equal the x least significant bits of the first operand, respectively, when the first circuit operates in a third mode, and;

a second circuit coupled to receive the second operand and configured to generate a third operand, wherein the x most significant bits of the third operand equal the x most significant bits of the second operand, respectively, when the second circuit operates in one mode, and wherein the x most significant bits of the third operand equal the x least significant bits of the second operand when the second circuit operates in another mode.

13. The circuit of claim 12 wherein the first circuit comprises:

first and second control nodes configured to receive first, second and third control signals, wherein the first circuit operates in the first mode when the first and second control nodes receive the first control signal, wherein the first circuit operates in the second mode when the first and second control nodes receive the second control signal, and wherein the first circuit operates in the third mode when the first and second control nodes receive the third control signal;

a first set of multiplexers;

a second set of multiplexers;

an OR gate;

wherein each multiplexer of the first and second set has a pair of data inputs, a control input and a data output, wherein the OR gate has a pair of inputs and an output, and wherein the first and second control nodes;

wherein the inputs to the OR gate are coupled to the first and second control nodes;

wherein the output of the OR gate is coupled to the control inputs of the first set of multiplexers, and;

wherein the control inputs of the second set of multiplexers are coupled to the second control node.

* * * * *